US010421405B2

(12) United States Patent
Good et al.

(10) Patent No.: US 10,421,405 B2
(45) Date of Patent: Sep. 24, 2019

(54) STEP HITCH ASSEMBLY

(71) Applicant: Advanced Engineering Group, LLC, Valencia, CA (US)

(72) Inventors: Jeff Good, Cayucos, CA (US); Arvinder Singh, Valencia, CA (US); Hardeep Singh, Valencia, CA (US)

(73) Assignee: ADVANCED ENGINEERING GROUP, LLC, Valencia, CA (US)

(*) Notice: Subject to any disclaimer, the term of this patent is extended or adjusted under 35 U.S.C. 154(b) by 0 days.

(21) Appl. No.: 15/925,531

(22) Filed: Mar. 19, 2018

(65) Prior Publication Data
US 2018/0265007 A1 Sep. 20, 2018

Related U.S. Application Data

(60) Provisional application No. 62/473,197, filed on Mar. 17, 2017.

(51) Int. Cl.
*B60R 3/00* (2006.01)
*B60D 1/06* (2006.01)
*B60D 1/46* (2006.01)

(52) U.S. Cl.
CPC ............... *B60R 3/007* (2013.01); *B60D 1/06* (2013.01); *B60D 1/46* (2013.01)

(58) Field of Classification Search
CPC .. B60R 3/007; B60R 3/00; B60R 3/04; B60D 1/00; B60D 1/06; B60D 1/46; B60D 1/065; B60D 1/07; B60D 1/54; B60D 1/48; B60D 1/01
See application file for complete search history.

(56) References Cited

U.S. PATENT DOCUMENTS

| 5,265,899 | A  | * | 11/1993 | Harrison | B60D 1/07 280/416.1 |
| 6,189,910 | B1 | * | 2/2001  | Bartel   | B60D 1/06 280/491.1 |
| 7,029,022 | B2 | * | 4/2006  | Moss     | B60D 1/06 280/416.1 |
| 7,081,197 | B1 | * | 7/2006  | Davis    | B60D 1/00 280/507   |

(Continued)

*Primary Examiner* — James M Dolak
(74) *Attorney, Agent, or Firm* — R. Lynette Wylie; APEX Juris, PLLC.

(57) ABSTRACT

A step hitch assembly providing a platform surface elevated from the ground level of a vehicle for facilitating access to a rooftop surfaces and elevated objects on or about the rooftop surface including a trailer hitch member attachable to a vehicle hitch receiver, a step platform having at least two substantially planar surfaces in substantially parallel alignment adjoined by a transverse panel to thereby define a space therebetween fastenable to the vehicle hitch receiver in alternative horizontally and vertical orientations and having a plurality of corresponding transverse spaced perforations sized and spaced in transverse alignment for detachable coupling of a tow accessory hitch receiver having receiver holes to corresponding spaced perforations and a locking member capable of alternatively securing the hitch receiver in an extended position wherein the hitch receiver ball protrudes from the step platform or in a retracted position wherein the tow accessory hitch receiver ball is retracted in the space formed between the substantially planar surfaces of the step platform.

15 Claims, 5 Drawing Sheets

(56) References Cited

U.S. PATENT DOCUMENTS

| | | | | |
|---|---|---|---|---|
| 7,258,359 B2* | 8/2007 | Wooten | .................... | B60D 1/06 |
| | | | | 280/164.1 |
| 7,661,693 B1* | 2/2010 | Lipski | ...................... | B60D 1/06 |
| | | | | 280/164.1 |
| 8,033,563 B2* | 10/2011 | Good | .................... | B60D 1/065 |
| | | | | 280/416.1 |
| 8,393,629 B2* | 3/2013 | Wotherspoon | .......... | B60R 3/007 |
| | | | | 280/163 |
| 8,844,962 B2* | 9/2014 | Bernart | .................... | B60D 1/58 |
| | | | | 280/164.1 |
| 9,085,264 B2* | 7/2015 | Anderson | ............... | B60R 3/007 |
| 9,199,520 B2* | 12/2015 | Weipert | .................... | B60D 1/07 |
| 9,242,608 B2* | 1/2016 | Masanek, Jr. | ............. | B60R 3/00 |
| 9,849,739 B2* | 12/2017 | Siegel | ...................... | B60R 3/04 |

* cited by examiner

STEP HITCH ASSEMBLY

FIELD OF THE INVENTION

A step hitch assembly comprising an upper and lower planar panel and an adjoining side wall, having a use and storage mode for accessing rooftop and truck bed carriers and cargo.

BACKGROUND

Access to vehicle rooftops, which may be as much as 7 to 8 feet from the ground, and truck beds and cargo stored there therefore beyond the reach of most people. To access such hard to reach areas, persons often climb onto a makeshift boost, such as, a vehicle doorway floorboard, upper portion of wheel, or bumper. However, such makeshift boosts are inconvenient and potentially hazardous, as they do not have suitable surfaces for footholds. Due to discomfort and hazards attendant to the minimal flat and slippery surface area thereby provided, they are not amenable to safe or extended use.

One makeshift boost to access rooftop and other hard to reach areas may include a trailer receiver hitch tube for receiving the shaft of a ball mount to which trailers, bicycle racks or other carriers. However, the thin transverse axis of the hitch tube and spherical configuration of any mounted hitch ball render such boosts cumbersome and hazardous for the purpose of providing a height boost to gain rooftop or truck bed access.

In the past, hitch receiver-mounted step systems for accessing rooftop and other cargo storage and carrier systems and truck beds have been developed. Such conventional hitch steps typically provide a flat step top surface and walls that surround a ball mount when in use and then may be moved to a storage position to expose the hitch ball when in and unused or stored position so a trailer may be hitched to the ball. Unfortunately, the storage position of such prior art steps has several drawbacks. Its upwardly exposed edge poses threat of injury. Hinges or other mechanisms for flipping the step from may be prone to mechanical failure, particularly following exposure to rain, snow, sleet, salt and other untoward road conditions. Moreover, use of the step is disabled when a trailer is hitched to the ball mount and the step thus placed in the stored or "up" position. Therefore, the step cannot be used while a trailer or other cargo carrier is hitched to the ball mount. However, the low, fixed position of the below-ball mount step provides limited access and adaptability to various uses. Thus, a need persists for a hitch mounted step addressing such and other problems with the prior art.

SUMMARY OF THE INVENTION

Addressing such and other disadvantages of prior art step hitch systems, the present invention provides an adaptive step hitch for use with a corresponding hitch receiver and ball mount comprising a stable and durable double step platform. The step hitch assembly according to the present invention provides a platform surface elevated from the ground level of a vehicle for facilitating access to a rooftop surfaces and elevated objects on or about the rooftop surface. Features of the present invention include a trailer hitch member for securing the step hitch assembly to a vehicle hitch receiver, a step platform affixed to the trailer hitch member wherein the step platform has at least two substantially planar surfaces in substantially parallel alignment adjoined by a common side wall to thereby form space therebetween, wherein the at least two substantially planar surfaces each have a plurality of corresponding transverse spaced perforations sized and spaced in transverse alignment, a fastener member for securely coupling the trailer hitch member to the vehicle hitch receiver, a tow accessory hitch receiver having receiver holes for detachable coupling to the corresponding transverse spaced perforations of the step platform, and a locking member capable of alternatively securing the hitch receiver in an extended position wherein the hitch receiver ball protrudes from the step platform or in a retracted position wherein the tow accessory hitch receiver ball is retracted in the space formed between the at least two substantially planar surfaces of the step platform.

The tow accessory hitch receiver includes a hitch receiver ball sized and shaped for receiving a hitch mount of a tow accessory, and may be adapted to a double ball hitch as shown in the drawings or single ball hitch. In particularly preferred embodiments, the tow accessory hitch receiver is a dual ball hitch receiver for secure engagement of a tow accessory hitch receiver wherein the dual ball hitch receiver includes a first ball sized and shaped to receive a hitch having a corresponding hitch mount concavity of a first diameter and a second ball sized and shaped to receive a hitch mount concavity of a second diameter. Alternative embodiments of the tow accessory hitch receiver balls may employ standard size ball hitches of 1.25×1.25 inches (3.2× 3.2 cm), 2×2 inches (5×5 cm), 2.7×2.7 inches (5.6×5.6 cm) or and may also include irregular size hitch mounts.

In preferred embodiments, the adaptive step hitch is comprised of an upper and lower planar surface providing an upper step platform surface adjoined by a perpendicularly aligned wall and a corresponding height adjustable hitch ball. In preferred embodiments, the step hitch of the present invention is a generally rectangular configuration dimensioned to accommodate one foot or both feet of a user. However, the inventive scope of the invention is not limited to the described and drawn configurations, but may be variously sized and shaped. For example, a parabolic or elliptical shape with a foothold portion could be used. in the present invention.

Preferred embodiments of the step hitch assembly according to the present invention have upper and lower planar surfaces oriented in parallel alignment and are adjoined by at least one back wall or, in alternative embodiments, one or more common wall extending between the two planar surfaces preferably along a rear section of the step platform and may also extend between ends of the planar surfaces and leaving open the space formed between the planar surfaces to provide an opening for receiving the tow accessory hitch receiver. Parameters of the upper and lower planar surfaces are sized to safely and comfortably support at least one and preferably both feet of a user, and may vary in dimensions to preferably measure between about 5 inches (22.5 cm) to about 14 inches (5.2 cm) long and about 4 inches (10 cm) to about 12 inches deep with at least one or more contiguous side walls measuring between about 3 to about 6 inches tall. Alternative embodiments may employ various sized planar surfaces of various shapes so long as they provide a platform supporting one or both feet of a user.

Features of the present invention include adaptive height and mounting of tow accessories including trailers of various sizes, and cargo or equipment carriers as well as any other suitable tow equipment. By adjusting the pin or fastener position along the vertical axis of the present step hitch in stored position, the spaced apart orientation of the horizontally aligned coupled perforations on the planar surfaces enable adapting the height of a ball mount, or other accessory. A particular accessory feature for adaptive orientation of accessories and cargo racks or carriers includes extension rods to which carriers or extended steps mountable to coupled horizontally aligned perforations of the present step hitch whereby extensions facilitating clearance and access are provided. An exemplary extension comprises an additional step extending from a rod having a bracket or similar anchor mechanism pinned to the perforation capable of attaching a step extension in any direction needed to access an area in, on or around the vehicle. Thus, the carrier or other accessory can be variously positioned to facilitate access, clearance, or to accommodate a user's height, improved aerodynamic cargo positioning or otherwise promote safe, convenient or comfortable orientation of the accessory. Thus, it can be readily seen that the step configuration may also be varied for adaptive use with a particular hitch receiver, double or single ball mount, type of vehicle, accessory, equipment or cargo, or type of accessory or size of user, among other things.

The step hitch assembly of the present invention may be comprised of any rigid material of a suitable tensile strength and durability. Such materials include, without limitation, a suitable sheet metal alloy, stainless steel, aluminum, carbon fiber or similar material provided in a single forged or otherwise integrally formed piece, or be assembled with commercially available bolts, washers and nuts or other commercially available fasteners. The step platform may be fabricated from a durable sheet metal or molded from a durable and rigid material.

The present invention further includes a method for providing a step assembly for a vehicle tow hitch, including the steps of providing a trailer hitch member for securing the hitch assembly to a vehicle hitch receiver wherein the trailer hitch member and vehicle hitch receiver have corresponding through holes spaced and sized for coupled engagement, providing a step platform affixed to the trailer hitch member, wherein the step platform has at least two substantially planar surfaces in substantially parallel alignment adjoined by a common side wall to thereby form space therebetween, wherein the at least two substantially planar surfaces each have a plurality of corresponding transverse spaced perforations sized and spaced in transverse alignment, detachably coupling the corresponding through holes of the hitch assembly member and the vehicle hitch receiver so as to alternatively secure the step platform to position the at least two substantially planar surfaces of the step platform in a substantially horizontal orientation when the step hitch assembly is in a use position and to position the at least two substantially planar surfaces of the step platform in a substantially vertical orientation when the step hitch assembly is in a stored position for securing a tow accessory at a selected height, and alternatively securing the hitch receiver in an extended position wherein the hitch receiver ball protrudes from the step platform or in a retracted position wherein the tow accessory hitch receiver ball is positioned in a rearward direction in the space formed between the at least two substantially planar surfaces of the step platform.

The configuration and parameters of the step hitch assembly are illustrative and are adaptable to suit a particular purpose or fit around a corresponding hitch ball mount, including a single or double hitch ball mount such as shown in the drawings of the preferred embodiments further described below.

DETAILED DESCRIPTION OF THE PREFERRED EMBODIMENTS

Figure 1:
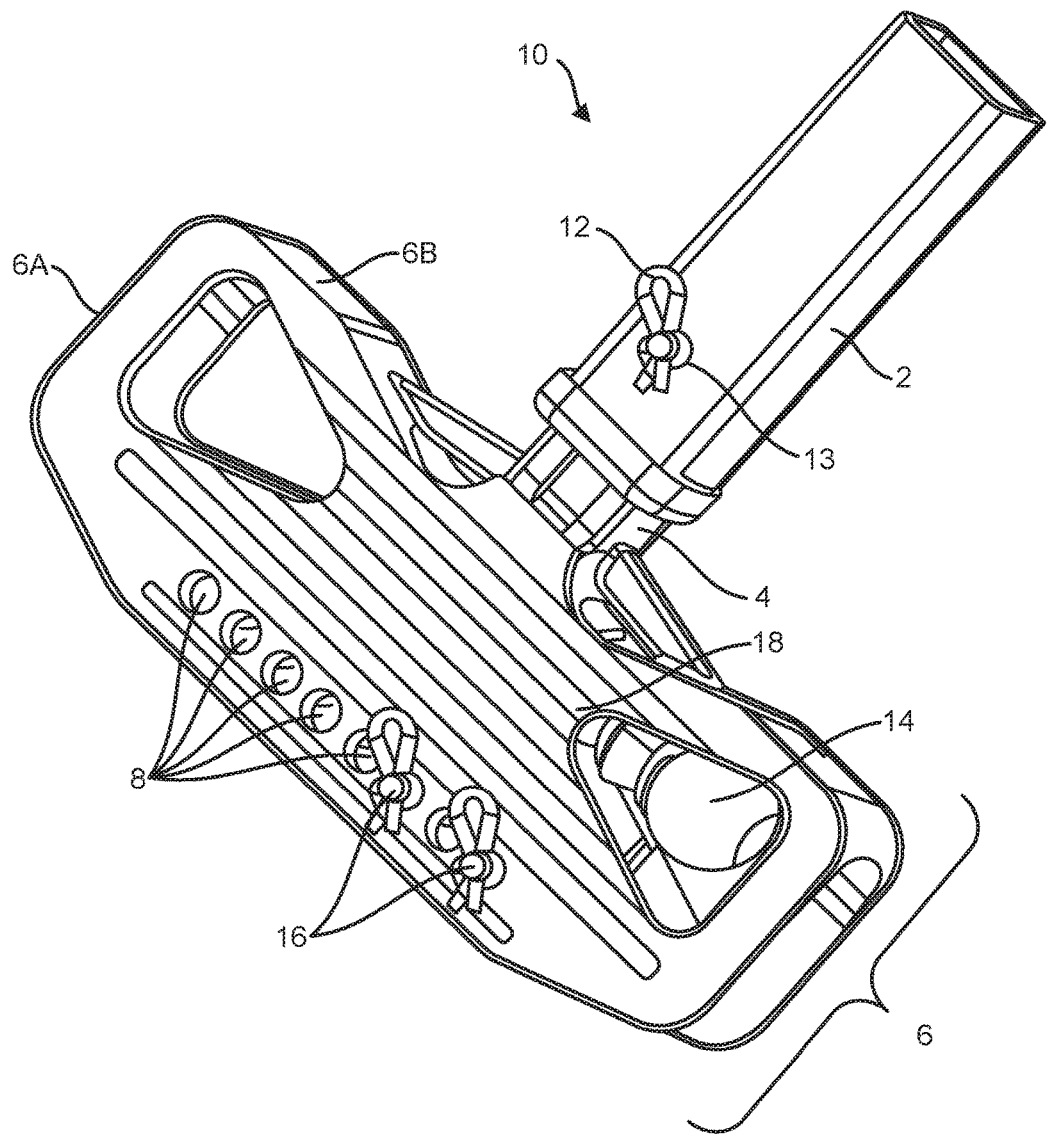
FIG. 1 is a top perspective view of a preferred embodiment of the present invention showing the step platform in a vertical position and the tow accessory hitch receiver in retracted position.
Figure 2:
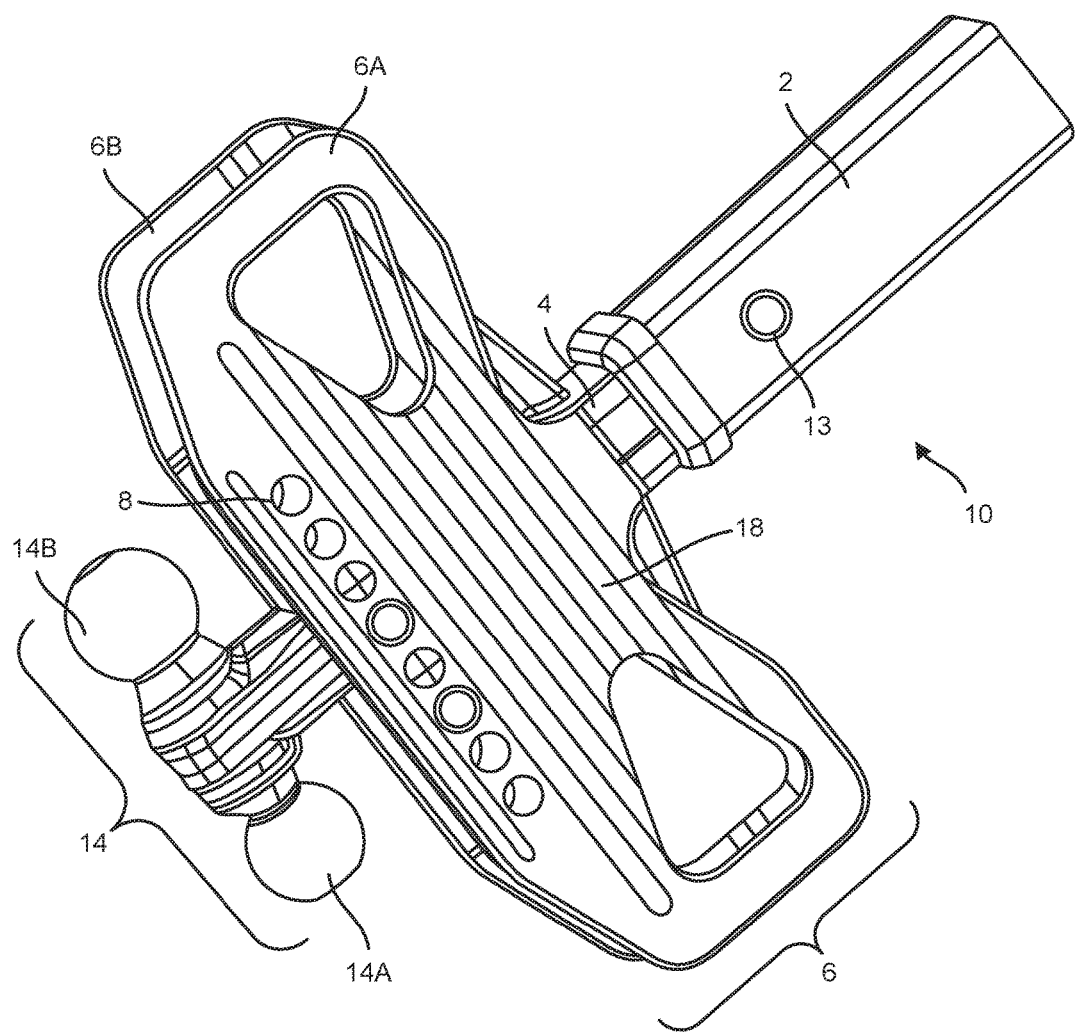
FIG. 2 is a side perspective view of a preferred embodiment of the present invention showing the step platform fastened into the vehicle hitch receiver in a vertically oriented position and the tow accessory hitch receiver in extended or use position.
Figure 3:
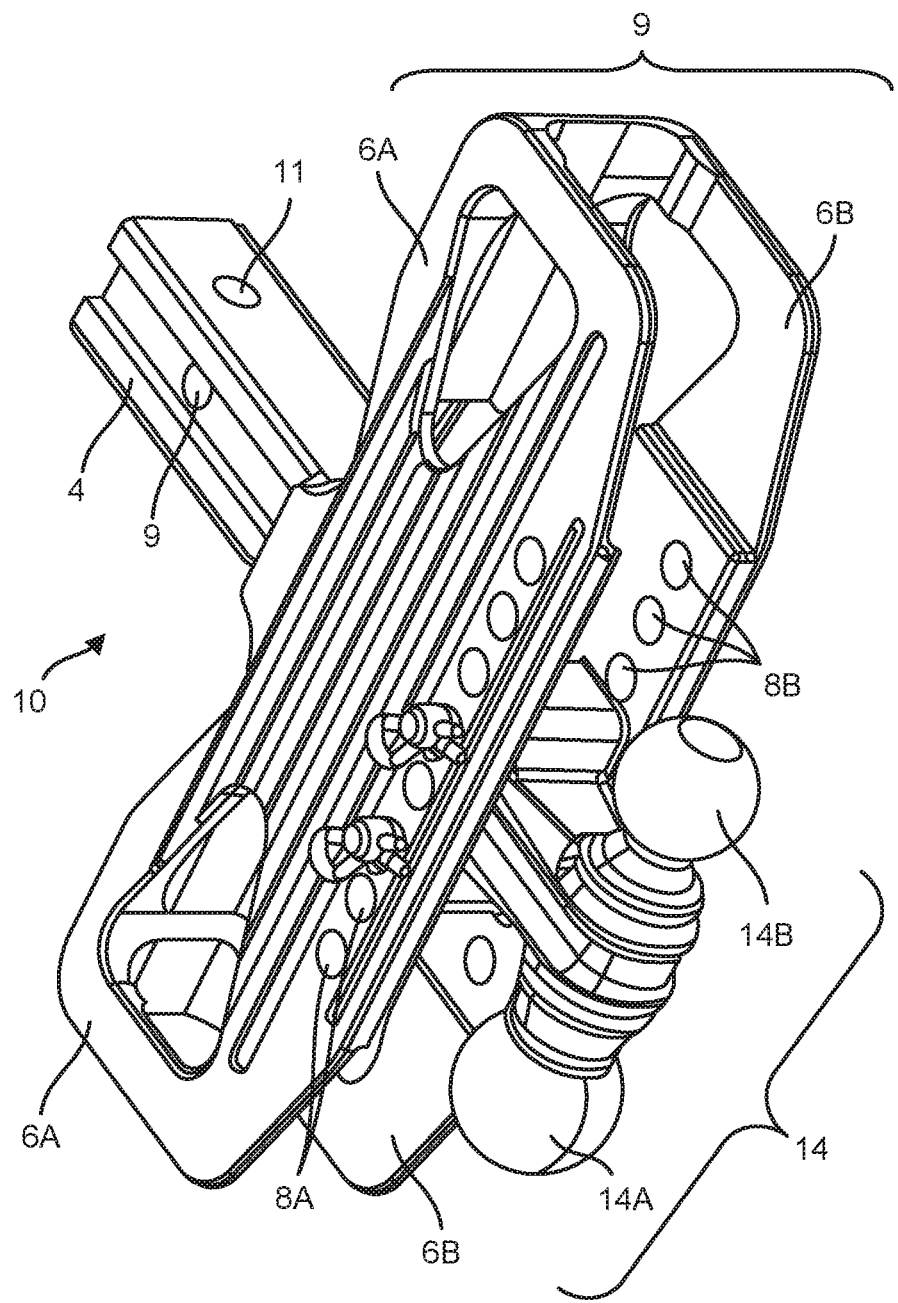
FIG. 3 is a side perspective view of a preferred embodiment of the present invention showing the step platform in a vertically oriented position with the tow accessory hitch receiver locked in extended position.
Figure 4:
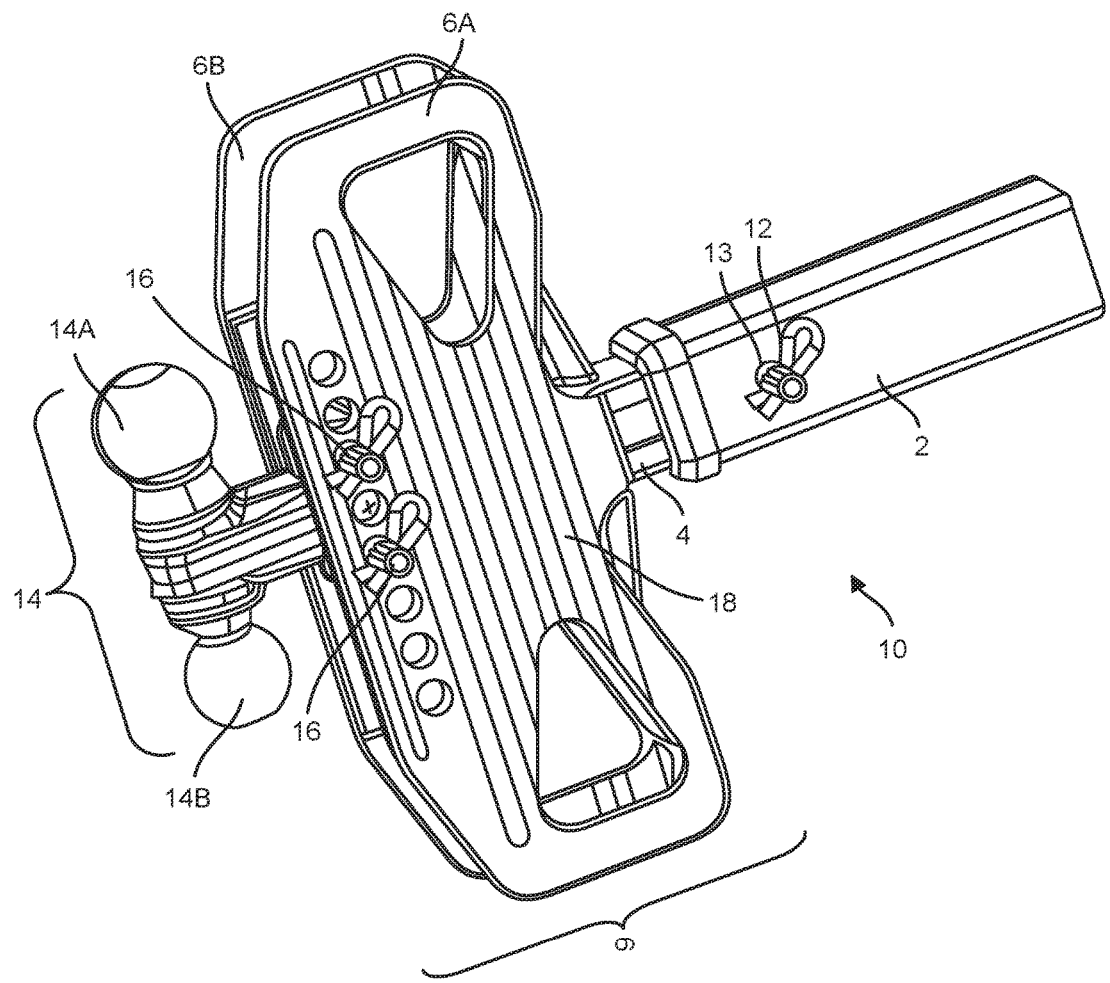
FIG. 4 is a side perspective view of a preferred embodiment of the present invention showing the step platform in a vertically oriented position with the tow accessory hitch receiver locked in extended position.

Now referring to FIGS. 1-5, the illustrated embodiment of the present invention exemplifies a preferred configuration and operation of the step hitch assembly for providing a platform surface elevated from the ground level of a vehicle for facilitating access to a rooftop surfaces and elevated objects on or about the rooftop surface is described in detail. As shown, components of the present step hitch assembly 10 include a trailer hitch member 4 for securing the step hitch assembly 10 to a vehicle hitch receiver 2 wherein the trailer hitch member 4 and vehicle hitch receiver 2 have corresponding through holes 9 and 11 13 spaced and sized for coupled engagement with through hole 13 of vehicle receiver 2 for alternatively aligning step hitch assembly 10 along a substantially horizontal or a vertical axis. Still referring Figs. 1-4 the step platform 9 includes two substantially planar surfaces 6A and 6B oriented in substantially parallel alignment adjoined by at least one transverse panel to thereby define a space therebetween. Planar surfaces 6A and 6B each have a plurality of corresponding transverse spaced perforations 8A and 8B sized and spaced for aligned correspondence along an axis transverse to planar surfaces 6A and 6B. The illustrated embodiment further includes fastener member 12 for detachably coupling with corresponding through holes 11 and 13 of hitch assembly member 4 and vehicle hitch receiver 2. According to the illustrated embodiment, hitch assembly member 4 and step platform 9 are alternatively securable to position planar surfaces 6A and 6B of the step platform in a substantially horizontal orientation (not shown) as illustrated in FIG. 3 by engaging a clip pin 16 to engage through holes 11 of hitch assembly 4 with side through hole 13 of vehicle hitch receiver 2 and in an upright position wherein planar surfaces 6A and 6B of step platform 6 are secured in a substantially vertical orientation as shown in FIGS. 1, 2 and 4 by securing clip pins 16 in coupled correspondence to engage through hole 9 of hitch assembly 4 with side through hole 13 of vehicle hitch receiver 2. As further illustrated in FIGS. 3 and 4, clip pins 16 further secure in coupled correspondence with spaced perforations 8A and 8B to position tow accessory hitch receiver 14 so dual hitch receiver balls 14A and 14B protrude outwardly and thereby availing tow accessory hitch receiver 14 for mounting of a corresponding concavity of a tow accessory hitch mount. As shown in FIGS. 2-4, a particularly preferred embodiment features a dual ball hitch receiver 14 including a first hitch receiver ball 14A measuring 2×2 inches (5×5 cm) and shaped to receive a corresponding tow accessory hitch mount concavity and a second hitch receiver ball 14B measuring 2.625×2.625 inches (6.67×6.67 cm) sized and shaped to receive a second corresponding tow accessory hitch mount concavity of a second diameter wherein the tow accessory has receiver holes for detachable coupling to the corresponding transverse spaced perforations of the step platform. In alternative embodiments, hitch receiver balls of various sizes for corresponding tow accessories may be used.

Still referring to FIGS. 1-4, step hitch assembly 10 includes locking member 16 capable of alternatively securing the hitch receiver in an extended position wherein the hitch receiver ball protrudes from the step platform as shown in FIGS. 2-4 or in a retracted position wherein the tow accessory hitch receiver ball is retracted wherein the tow accessory hitch receiver ball is positioned in a rearward direction in the space formed between the at least two planar surfaces 6A and 6B of step platform 9.

Now referring to FIG. 4, locking member shown in the particularly preferred embodiment employs two clip pins 16 each of which includes a pin and a clip wherein the pin is configured for coupled engagement with corresponding transverse spaced perforations and a pin hole and wherein the clip is configured to secure the clip pin within the selected corresponding spaced perforation when coupled each of the two clip pins 16 and has a hole and wherein the clip is configured for coupled engagement with respective clip pin 16 within the selected corresponding spaced perforations 8 when coupled in locked engagement with the respective clip pin 16.

A further feature of the particularly preferred embodiment include configuring planar surfaces 6A and 6B in a substantially rectangular configuration with opposing elongate sides dimensioned to accommodate one foot or both feet of a user. Planar surfaces 6A and 6B of the illustrated preferred embodiment measures about 15 inches and opposing ends measuring about 3 inches (7.5 cm) wherein planar surfaces 6A and 6B are set apart about 10 inches (25 cm) adjoined by at least one transverse panel to thereby define an interior space measuring about 15 inches (37.5 cm) long×10 inches (25 cm) high×3 inches (7.5 cm) deep. In alternative embodiments planar surfaces 6A and 6B may be variously sized and shaped to receive a corresponding tow accessory hitch receiver 14.

As shown in FIGS. 1-4, an upper surface of the step platform 9 has skid resistant indentations. Alternative embodiments may employ alternative materials or indentation patterns to prevent a user from sliding or slipping off step hitch assembly 10. In addition, the present step hitch assembly may be brightly painted or lighted in order to optimize visibility and thus minimize risk it not be detected and potentially injure a passerby.

Step hitch assembly member 10 includes fastener holes sized and oriented such that corresponding fastener clip pins are capable of detachably coupling step platform 9 with through holes of hitch assembly member 4 to alternatively secure the step platform 9 in a substantially horizontal orientation when the step hitch assembly is in a use position and in a substantially vertical orientation wherein tow accessory receiver hitch 14 is capable of being coupled with a corresponding tow accessory hitch mount concavity when the step hitch assembly 10.

In particularly preferred embodiments, the upper surface of the step platform may be provided with safety features such as, for example, a bright color or an anti-skid, rubberized or otherwise textured surface, or alternative perforated grate patterns.

Now referring to FIGS. 2-4, alternative embodiments may further be provided with fastener holes or anchors on planar surfaces 6A and 6B corresponding to holes or posts on hitch ball mount 14. As shown in the drawings, clip pins 16 are couplable to corresponding holes of planar panels and hitch ball mount to secure the hitch ball in either a use, i.e., tow position shown in FIGS. 2-4 or storage position shown in FIG. 1. A feature of alternative embodiments of the present invention include adapting the height of the hitch ball by adjusting clip pins 16 to corresponding holes of tow accessory receiver 14 by selecting corresponding spaced perforations 8 of planar surfaces 6A and 6B securing the tow accessory hitch receiver 14 and inserting a clip pins 16 through respective aligned spaced perforations 6A and 6B and tow accessory hitch receiver 14. Insertion of a clip pins 16 holds tow accessory receiver hitch 14 in secure alignment.

Figure 5:
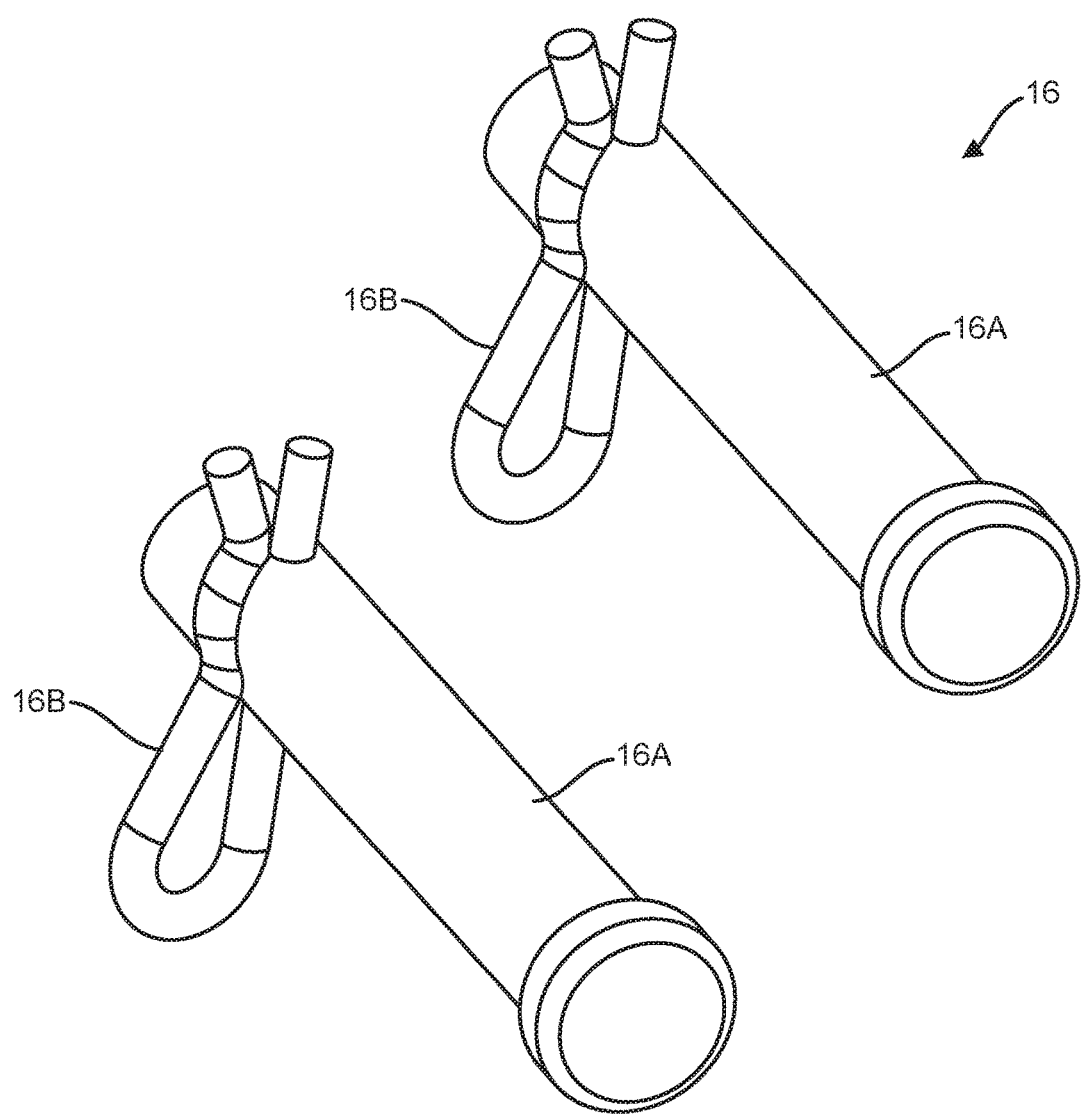
FIG. 5 is a perspective view of a dual clip pin including a pin and clip for securing the ball mount in the step hitch as shown in FIGS. 1, 3 and 4.

In alternative embodiments when planar surfaces 6A and 6B of step hitch assembly 10 are in stored, vertically aligned position, additional cargo or equipment carriers or accessories may be secured by pinning through horizontally aligned coupled perforations spaced along the edge of the step. Alternatively, a bicycle rack, cargo carrier, or other accessory could be mounted by fastening corresponding holes, hooks, clasps, bungee cords or other suitable fastener system through coupled perforations of the vertically aligned step hitch of the present invention. Thus, the adaptive design of the present invention facilitates detachable engagement of additional accessories to the vertically positioned planar panels when in tow or stored position, including, for example, pintle hooks or cargo carriers, bicycle racks, and boxes or cages for gear which may be fastened by a clevis pin and a secured clip pins 16 such as shown in FIG. 5 or any comparable commercially available fasteners, including any suitable pin, hook, clasp, bungee cord or other corresponding mated fastener component such as, for example, adaptable to detachably fasten additional cargo or equipment to the perforations on the opposing planar surfaces of the present vehicle hitch receiver.

It will be appreciated by persons of ordinary skill in the art that many configurations, variations and permutations of the present invention may provide the purpose and needs availed by the adaptive step hitch of the present invention and therefore fall within the inventive scope thereof.

The invention claimed is:

1. A step hitch assembly providing a platform surface elevated from the ground level of a vehicle for facilitating access to a rooftop surface and elevated objects, comprising:
   a trailer hitch member for securing the step hitch assembly to a vehicle hitch receiver;
   a step platform affixed to the trailer hitch member, wherein the step platform has at least two substantially planar surfaces in substantially parallel alignment adjoined by at least one transverse panel to thereby provide a space therebetween, wherein the at least two substantially planar surfaces each have a plurality of corresponding spaced perforations sized and spaced for aligned correspondence along an axis transverse to the at least two substantially planar surfaces, and wherein the trailer hitch member is capable of detachably securing the vehicle hitch receiver such that the step platform member is capable of being alternatively secured in a substantially horizontal orientation and a substantially vertical position;
a tow accessory hitch receiver having receiver holes for detachable coupling to the corresponding spaced perforations of the step platform; and
a locking member capable of alternatively securing the tow accessory hitch receiver in an extended position wherein a hitch receiver ball protrudes from the step platform or in a retracted position wherein the hitch receiver ball is retracted in the space formed between the at least two substantially planar surfaces of the step platform.

2. The step hitch assembly of claim 1, wherein the tow accessory hitch receiver ball is sized and shaped for receiving a hitch mount having a corresponding hitch mount concavity.

3. The step hitch assembly of claim 1, wherein the tow accessory hitch receiver is a dual ball hitch receiver for receiving a hitch mount wherein the dual ball hitch receiver includes a first ball sized and shaped to receive a hitch mount having a corresponding hitch mount concavity of a first diameter and a second ball sized and shaped to receive a hitch mount concavity of a second diameter.

4. The step hitch assembly of claim 1, wherein the trailer hitch member and the vehicle hitch receiver have corresponding through holes and wherein a fastener member for detachably securing to the corresponding through holes is a clip pin sized and shaped for coupled engagement with the corresponding through holes of the trailer hitch member and the vehicle hitch receiver.

5. The step hitch assembly of claim 4, wherein the locking member is two clip pins, wherein each of the two clip pins includes a pin and a clip wherein the pin is configured for coupled engagement with the corresponding spaced perforations and has a hole and wherein the clip is configured to secure the clip pin within the selected corresponding spaced perforations when coupled in locked engagement with the pin hole.

6. The step hitch assembly of claim 5, wherein the at least two substantially planar surfaces are substantially rectangular with opposing elongate sides joined by opposing ends, wherein the opposing ends are adjoined by corresponding side walls and the outer elongate side is sized and shaped to receive the tow accessory hitch receiver.

7. The step hitch assembly of claim 6, wherein the at least two substantially planar surfaces are a generally rectangular configuration dimensioned to accommodate one foot or both feet of a user.

8. The step hitch assembly of claim 7, wherein an upper surface of the step platform has skid resistant indentations.

9. A step hitch assembly providing a platform surface elevated from the ground level of a vehicle for facilitating access to a rooftop surface and elevated objects, comprising:
a trailer hitch member for securing the hitch assembly to a vehicle hitch receiver wherein the trailer hitch member and vehicle hitch receiver have corresponding through holes spaced and sized for coupled engagement;
a step platform affixed to the trailer hitch member, wherein the step platform has at least two substantially planar surfaces in substantially parallel alignment adjoined by at least one transverse panel to thereby provide a space therebetween, wherein the at least two substantially planar surfaces each have a plurality of corresponding transverse spaced perforations sized and spaced for aligned correspondence along an axis transverse to the at least two substantially planar surfaces;
a fastener member for detachably coupling the corresponding through holes of the trailer hitch member and the vehicle hitch receiver so as to alternatively secure the step platform to position the at least two substantially planar surfaces of the step platform in a substantially horizontal orientation when the step hitch assembly is in a use position and to position the at least two substantially planar surfaces of the step platform in a substantially vertical orientation when the step hitch assembly is in a stored position for securing a tow accessory at a selected height; and
wherein the tow accessory is a tow accessory hitch receiver having a dual ball hitch receiver including a first ball sized and shaped to receive a corresponding tow accessory hitch mount concavity of a first diameter and a second ball sized and shaped to receive a corresponding tow accessory hitch mount concavity of a second diameter wherein the tow accessory hitch receiver has receiver holes for detachable coupling to the corresponding transverse spaced perforations of the step platform.

10. The step hitch assembly of claim 9, further comprising a locking member capable of alternatively securing the tow accessory hitch receiver in an extended position wherein the tow accessory hitch receiver balls protrude from the step platform or in a retracted position wherein the tow accessory hitch receiver balls are retracted and the tow accessory hitch receiver balls are positioned in a rearward direction in the space between the at least two substantially planar surfaces of the step platform.

11. The step hitch assembly of claim 10, wherein the locking member has two clip pins including a pin and a clip wherein the pin is configured for coupled engagement with the corresponding transverse spaced perforations of the at least two substantially planar surfaces and includes a pin hole, wherein the clip is configured for coupled engagement to thereby secure the clip pin within the selected corresponding transverse spaced perforation when coupled to the pin hole.

12. The step hitch assembly of claim 10, wherein the at least two substantially planar surfaces are substantially rectangular with opposing elongate sides joined by opposing ends, wherein the opposing ends are adjoined by corresponding side walls and the outer elongate side is sized and shaped to receive the tow accessory hitch receiver.

13. The step hitch assembly of claim 10, wherein the at least two substantially planar surfaces are a generally rectangular configuration dimensioned to accommodate one foot or both feet of a user.

14. The step hitch assembly of claim 13, wherein an upper surface of the step platform has skid resistant indentations.

15. A method for providing a step hitch assembly for a vehicle tow hitch, comprising the steps of:
providing a trailer hitch member for securing the step hitch assembly to a vehicle hitch receiver wherein the trailer hitch member and vehicle hitch receiver have corresponding through holes spaced and sized for coupled engagement;
providing a step platform affixed to the trailer hitch member, wherein the step platform has at least two substantially planar surfaces in substantially parallel alignment adjoined by a common side wall to thereby form a space therebetween, wherein the at least two substantially planar surfaces each have a plurality of corresponding transverse spaced perforations sized and spaced in transverse alignment;

detachably coupling the corresponding through holes of the trailer hitch member and the vehicle hitch receiver so as to alternatively secure the step platform to position the at least two substantially planar surfaces of the step platform in a substantially horizontal orientation when the step hitch assembly is in a use position and to position the at least two substantially planar surfaces of the step platform in a substantially vertical orientation when the step hitch assembly is in a stored position for securing a tow accessory at a selected height; and alternatively securing the tow accessory wherein the tow accessory includes a tow accessory hitch receiver ball that protrudes from the step platform in an extended position for attachment to a corresponding tow accessory hitch mount concavity and wherein the tow accessory hitch receiver ball is retracted in a rearward position in the space formed between the at least two substantially planar surfaces of the step platform when not in use.

* * * * *